United States Patent

[11] 3,588,528

[72] Inventor Lewis M. Terman
South Salem, N.Y.
[21] Appl. No. 837,704
[22] Filed June 30, 1969
[45] Patented June 28, 1971
[73] Assignee International Business Machines Corporation
Armonk, N.Y.

[54] A FOUR PHASE DIODE-FET SHIFT REGISTER
13 Claims, 4 Drawing Figs.

[52] U.S. Cl. .......... 307/221, 307/238, 307/246, 340/173
[51] Int. Cl. .......... G11c 19/00
[50] Field of Search .......... 307/221 (C), 238, 246, 251, 279, 304; 328/37; 340/173

[56] References Cited
UNITED STATES PATENTS
3,497,715 2/1970 Yao Tung Yen .......... 307/221(C)X
OTHER REFERENCES
Dennard et al., FET Memory Cell Using Diodes As Load Devices, I.B.M. Technical Disclosure Bulletin, Vol. 11, No. 6, November 1968, pp. 592 & 593. 307/279

*Primary Examiner*—Stanley T. Krawczewicz
*Attorneys*—Hanifin and Jancin and Thomas J. Kilgannon, Jr.

ABSTRACT: A four phase diode-field-effect effect transistor shift register stage is disclosed. Each register stage includes two identical circuits each comprising two diodes and a field-effect transistor. Each circuit contains a node which is connected to the gate of the field effect transistor of a succeeding circuit or to the first circuit of a similar shaft register stage. Pulsed voltage sources Φ1 and Φ2 are serially disposed in one of the circuits and pulsed voltage sources Φ3 and Φ4 are serially disposed in the other of the circuits of each shift register stage. Depending on whether the field effect transistors are N-channel or P-channel, pulsed voltages of the proper polarity are applied in sequence to apply a voltage to the node of each circuit in turn. If the FET of the first circuit of a stage is conditioned by placing information on its gate, and Φ1 and Φ2 pulses are applied to the circuit in sequence, the gate capacitance of the FET of the succeeding circuit is conditioned, in response thereto. Upon application of the Φ3 and Φ4 pulses to the succeeding circuit, the information pulse on the gate capacitance of the field-effect transistor of the succeeding circuit is transferred in inverted form to its output.

INVENTOR
LEWIS M. TERMAN

BY *Thomas J. Kilgannon Jr.*
ATTORNEY

A FOUR PHASE DIODE-FET SHIFT REGISTER

BACKGROUND OF THE INVENTION

1. Field of the Invention

This invention relates generally to multiphase shift registers which have application in computer and data systems as memory or as temporary storage locations for digital data awaiting use in following logic circuitry. More specifically, it relates to a four phase diode-field-effect transistor shift register in which each stage of the shift register consists of two pulsed circuits, each having an internal node which is connected to the control electrode of an FET in the succeeding circuit. Four pulsed sources, two of which are connected to each circuit, are operated in a sequence to apply voltages to the node of the first circuit of each stage and, depending upon the information signal on the gate capacitance of the FET of the first circuit, the voltage at the node remains or is discharged to ground upon the actuation of the second of the two pulsed sources associated with that circuit. Two other pulsed sources apply a voltage to the node of the second circuit of the inverter stage and depending upon the signal on the gate capacitance of its associated FET, that voltage is either applied to the output or discharged to ground when the second of the pulsed sources associated with that circuit is actuated. As a result of the arrangement shown, chip area requirements are substantially reduced over the prior art arrangements, and better performance as a result of faster transients is obtained because the diodes present a substantially lower impedance in the forward direction than other load devices. In addition, voltages at the node rise closer to the supply voltage and take a shorter time to reach the supply voltage when diodes are used. As a result, reduced drive voltages are obtained when diodes are used.

2. Description of the Prior Art

Known prior art shift register arrangements are of the two phase or four phase variety and incorporate anywhere from six to eight transistors per shift register stage. Because four phase shift registers are somewhat faster acting and have reduced area requirements over known two phase type shift registers, the four phase variety is usually preferred in applications where minimum size and high performance are requirements. A four phase shift register stage incorporating only FET's which is energized by the sequential application of potentials to the circuits of the shift register stage is well known. The known arrangement incorporates FET's in its charge and discharge paths as load and switching devices which provide an appropriate impedance when their associated phase pulsed sources are activated. The use of FET's as load devices in integrated circuits requires a good deal of semiconductor chip surface area. This is particularly deleterious where high density is a design requirement. Where high performance is also a requirement, the use of FET's as load devices have little to recommend them to the circuit designer.

The use of FET's in a source follower node is generally undesirable because slower operation results from the inherent reduction of the gate-to-source voltage as the source voltage moves toward the gate voltage. In addition, the threshold voltage of an integrated FET increases in magnitude as the source voltage departs from the substrate voltage, thereby reducing the effective gate voltage of the FET. The use of diodes, of course, obviates these effects.

Since high density and fast performance are important, any arrangement which can achieve reduction in surface area and at the same time provide high performance would be an extremely attractive alternative to the known shift registers, all of which suffer from a lack of at least one of the above defined desirable characteristics.

SUMMARY OF THE INVENTION

The present invention in its broadest aspect comprises first and second circuits each including first and second diodes and an FET connected in series; a node of the first circuit being connected to the gate of an FET in the second circuit; a node of the second circuit being connected to an element responsive to the presence of electrical charge. Voltage means are connected to the first circuit for applying voltages to render the first diode conductive and the second diode nonconductive during a first interval and thus charge the gate capacitance of the FET of the second circuit. Also included is a voltage means connected to the first circuit for applying voltages to its second diode to render it either conductive or nonconductive during a second interval to either charge or discharge the gate capacitance of the FET of the second circuit. Voltage means are connected to the second circuit for applying voltages to render its first diode conductive and its second diode nonconductive during a third interval to charge the element responsive to the presence of electrical charge. Finally, voltage means connected to the second circuit for applying voltages to its second diode to render it either conductive or nonconductive during a fourth interval to either charge or discharge the above mentioned element which may be the gate capacitance of the FET of a succeeding shift register stage.

In accordance with more specific aspects of the invention, a first pulsed voltage source is connected to the first diode and is operative to apply to the gate capacitance of the transistor in the second circuit a first potential which differs from a reference potential by a given polarity and magnitude only during the first interval. During this same interval, a second pulsed voltage source connected to the second diode applies a potential of the same polarity and of at least equal magnitude as the first potential to the second diode.

During the second interval, a second pulsed voltage source connected to the second diode applies a reference potential thereto and the second diode is rendered conductive and the above mentioned gate capacitance is either held charged or is discharged via the second diode when the FET in the first circuit is rendered either nonconductive or conductive, respectively. An information source connected to the gate of the FET in the first circuit renders it either nonconductive, or conductive during at least a portion of the second interval.

During a third interval, a third pulsed voltage source connected to the first diode of the second circuit is actuated to apply a potential of the same polarity as the first potential to its associated node only during the third interval, while at the same time a fourth pulsed voltage source connected to the second diode is actuated to apply a potential of the same polarity and of at least equal magnitude as the third potential.

Finally, during a fourth interval, a fourth pulsed voltage source connected to the second diode applies a potential only during the fourth interval so that an element responsive to the presence of electrical charge either remains charged or is discharged via the second diode in response to the charged or discharged condition of the gate capacitance of the FET of the second circuit.

In a preferred arrangement, the FET's are enhancement mode devices which may be either N-channel or P-channel devices and the diodes are either PN junctions or Schottky barrier diodes. The reference potential applied via the pulsed sources is preferably ground potential but, reference potential may be any potential and depending upon the type of FET's, the voltages applied may be either positive or negative. The shift register stage, of course, may be preceded and followed by identical shift register stages or it may form either the first or last stage of a plurality of such stages which, for example, may be utilized as a temporary information storage means. Using the combination of diodes and FET's described hereinabove, a substantial reduction in semiconductor chip area requirements can be obtained over the known prior art four phase shift registers. Also, power dissipation for this type of shift register stage is a minimum and high performance capability is maximized.

It should also be appreciated, that the voltages applied from the power sources, may vary considerably and that the sole criterion is that the voltages be sufficient to render the diodes conductive or nonconductive, as desired.

It is, therefore, an object of this invention to provide a four phase shift register stage which has reduced semiconductor chip area requirements, and is substantially faster than known shift registers than the same type.

The foregoing and other objects, features and advantages of the present invention will be apparent from the following more particular description of a preferred embodiment of the invention as illustrated in the accompanying drawings.

BRIEF DESCRIPTION OF THE DRAWINGS

FIG. 3 also shows an alternative diode and FET arrangement when the field effect transistor type is changed from N-channel to P-channel FIG. 4 also shows the pulse pattern utilized when the alternative arrangement of FIG. 3 is utilized.

DESCRIPTION OF A PREFERRED EMBODIMENT

In order to appreciate the distinctions between prior art four phase shift registers and the four phase shift register of the present invention, a relatively detailed discussion of the circuit and operation of a prior art four phase shift register will be made in what follows prior to the detailed exposition of the circuit and operation of the present invention.

Figure 1:
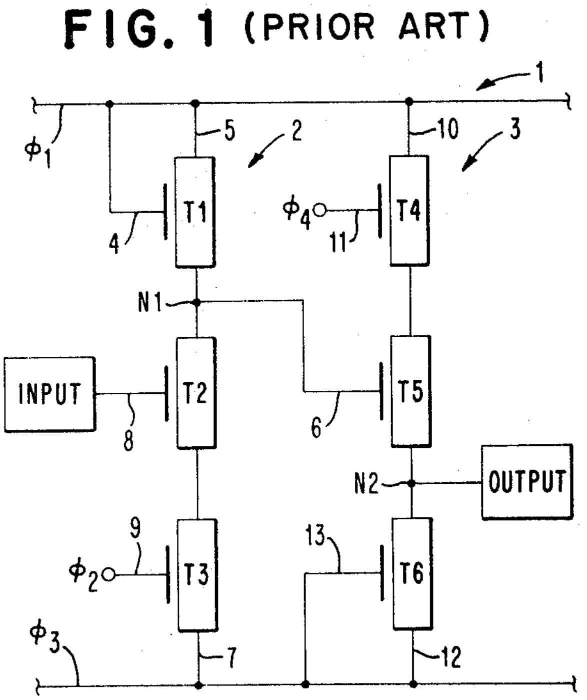
FIG. 1 (PRIOR ART)
FIG. 1 is a schematic diagram of a prior art four phase shift register which incorporates only field-effect transistors.

Referring now to FIG. 1, there is shown a four phase shift register 1 consisting of transistors T1 through T6 which, for purposes of demonstration may be N-channel enhancement mode devices. Each register stage 1 consists of two circuits 2 and 3; circuit 2 consisting of transistors T1 through T3 and circuit 3 consisting of transistors T4 through T6. The gate 4 drain 5 of transistor T1 are connected to a source of voltage indicated as Φ1 in FIG. 1. Transistor T2 is connected to transistor T1 via a node N1. Node N1 is connected to the gate electrode 6 of transistor T5 of circuit 3. Transistor T2 is connected in series with transistor T3 whose source 7 is connected to a source of voltage designated as Φ3 in FIG. 1. The gate electrode 8 of FET T2 is connected to a source of binary information labeled INPUT in FIG. 1 and the gate electrode 9 of transistor T3 is connected to a pulsed voltage source identified in FIG. 1 as Φ2. The source electrode 10 of FET T4 is connected to the pulsed voltage source identified as Φ 1 in FIG. 1 while the gate electrode 11 thereof is connected to a pulsed voltage source shown as Φ4 in FIG. 1. Transistor T5 which is connected in series with transistor T4 is also connected in series with transistor T6 at a node N2. Node N2 is shown in FIG. 1 connected to an element labeled OUTPUT which may be the gate capacitance of the first circuit of a succeeding register stage or any other device which is responsive to the presence of electrical charge. The source 12 of transistor T6 and the gate 13 thereof are both connected to a pulsed voltage source shown as Φ3 in FIG. 1.

Figure 2:
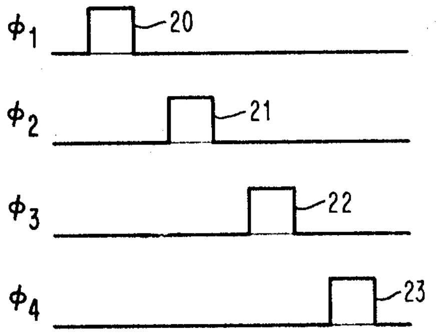
FIG. 2 (PRIOR ART)
FIG. 2 is a diagram of the pulse pattern applied to the four phase shift register of FIG. 1 showing the relative timing of each of the four phases utilized.

The circuit of FIG. 1 in transferring a binary information bit signal from the gate 8 of transistor T2 to the node N2 of circuit 3 operates as follows:

Assuming that transistors T1 through T6 are N-channel enhancement mode devices and that transistor T2 is in the ON condition as a result of a positive voltage being applied on gate 8 thereof, when voltage source Φ1 is actuated, a pulse 20 as shown in FIG. 2 is applied to the gate 4 and drain 5 of transistor T1 rendering that device conductive. Note that during this interval, all the other voltage sources Φ2 through Φ4 are at ground potential. When transistor T1 conducts, the voltage of source Φ1 is applied via N1 to the gate 6 of transistor T5, thereby charging up the gate capacitance of that transistor. During this time, transistor T3 is in a nonconducting condition because the voltage source Φ2 connected to its gate 9 is at ground potential. When pulse 20 ceases, transistor T1 becomes nonconducting but, because transistor T2 is conductive as a result of a positive voltage on its gate 8, part of a path to ground is established. The path to ground is blocked by transistor T3 which is in the nonconducting condition however, during the OFF time of pulsed voltage source Φ2. When pulsed voltage source Φ2 is activated, pulse 21 of FIG. 2 is applied to gate 9 of transistor T3 turning that transistor ON and establishing a conductive path to ground via pulsed voltage source Φ3 which, during the interval pulsed voltage source Φ2 is ON, is at ground potential. The charge stored on the gate capacitance of transistor T5 is then discharged to ground potential via transistors T2 and T3 which are in the conducting condition. Transistor T3 is turned OFF upon the termination of pulse 21 from pulsed voltage source Φ2. If transistor T2 had been in the nonconducting condition instead of the conducting condition as postulated above, the gate capacitance of transistor T5 would have remained charged up to approximately the value of the voltage of pulsed source Φ1 because its discharge path to ground would be blocked by transistor T2 in spite of the fact that transistor T3 is in a conducting condition. Thus, in response to either of two voltages on gate 8 of transistor T2, transistor T2 is either conductive or nonconductive and the information applied to its gate now appears in inverted form on the gate capacitance of transistor T5.

Referring now to circuit 3 of FIG. 1 and assuming that the gate capacitance of transistor T5 has been discharged to ground via node N1, transistor T5 is in a nonconducting condition. When a pulse 22 is applied to the drain 12 and gate 13 of transistor T6 from pulsed voltage source Φ3, transistor T6 is turned ON so that the potential of source Φ3 is applied to node N2. Upon cessation of pulse 22, transistor T6 is turned OFF. Because transistor T5 is nonconducting, when a pulse 23 is applied to the gate 11 of transistor T4 turning that transistor ON, node N2 will remain charged because of the blocking action of transistors T5 and T6 which are in the nonconducting condition. If, however, the potential on the gate capacitance of transistor T5 held that transistor in a conducting condition, when pulse 23 is applied from source Φ4, turning transistor T4 ON, node N2 discharges via conducting transistors T4 and T5 to ground potential which appears on the source 10 of transistor T4 from voltage source Φ1.

From the foregoing, then, it may be seen that information in binary form may be passed from an input to an output by the application of appropriate pulses to field-effect devices arranged as indicated above.

Figure 3:
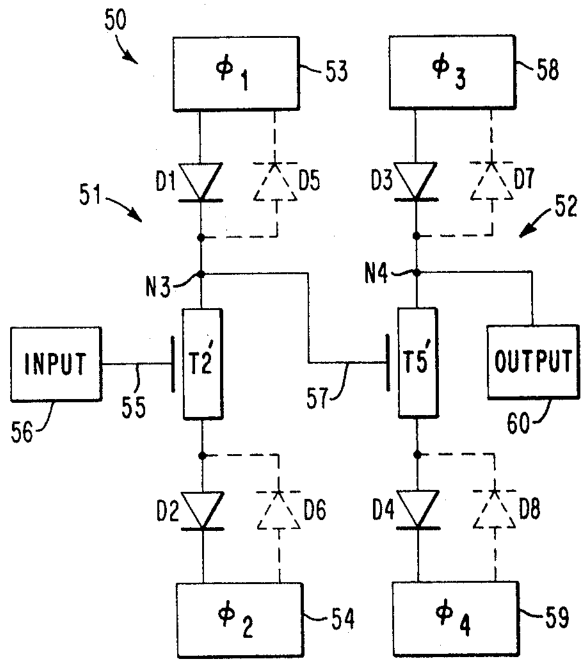
FIG. 3 is a partial-schematic, partial-block diagram of a four phase shift register which utilizes diodes and FET's in accordance with the teaching of the present invention.

The circuit arrangement of FIG. 3 accomplishes a result equivalent to that obtained by the circuit of FIG. 1. However, it will be demonstrated in what follows, that while the results are the same, they have been achieved in a way which offers the advantages outlined hereinabove in the object and in a way which is most compatible with present day integrated circuit advances.

In FIG. 3, a partial schematic, partial block diagram of a four phase shift register 50 is shown. Shift register 50 includes two circuits 51 and 52. Circuit 51 contains a field-effect transistor T2′ which is connected to diodes D1 and D2. Diode D1 is connected to a pulsed voltage source 53 shown as a block labeled Φ1 in FIG. 3 and diode D2 is shown connected to a pulsed voltage source 54 shown as a block labeled Φ2 in FIG. 3. A gate 55 of transistor T2′ is shown connected to a block 56 labeled INPUT in FIG. 3 which may be a source of digital data or the output of a shift register stage identical with the present shift register stage 50. Transistor T2′ is also connected via a node N3 to the gate 57 of transistor T5′ of circuit 52. In this manner, the gate capacitance of transistor T5′ is connected to node N3.

Transistor T5′ is shown in FIG. 3 connected to diodes D3 and D4 which, in turn, are connected to pulsed voltage sources which are shown in FIG. 3 as blocks 58 and 59, respectively, and are also labeled Φ3 and Φ4, respectively. A node N4 disposed between diode D3 and transistor T5′ is shown in FIG. 3 connected to a block 60 labeled OUTPUT which may be any element responsive to the presence of electrical charge or may be the gate capacitance of a succeeding shift register stage identical with shift register stage 51.

Transistors T2′ and T5′ have not been specifically identified as either N-channel or P-channel devices in FIG. 3 because these transistors may be either N-channel or P-channel FET's of the enhancement mode type. When transistors T2′ and T5′ are N-channel enhancement mode devices, diodes D1 to D4 are placed in the circuit so that they conduct in the direction indicated by the arrowhead of their schematic symbol. When transistors T2′ and T5′ are P-channel enhancement mode devices, however, diodes D1 through D4 are reversed as shown by the dotted diodes D5 through D8 in FIG. 3 and conduct in the direction of the arrowheads of their respective schematic symbols when appropriate voltages are applied thereto.

Figure 4:
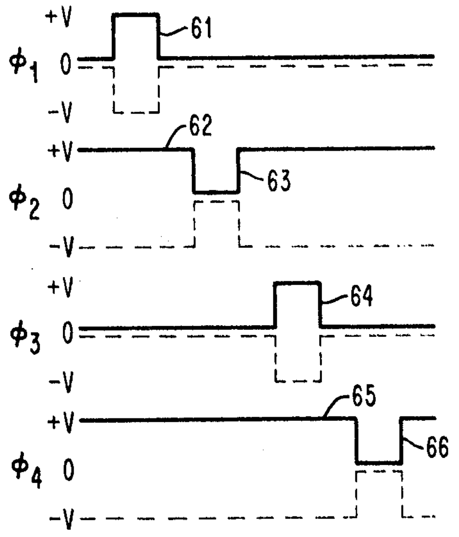
FIG. 4 is a diagram of the pulse pattern applied by each of the pulsed sources to the shift register of FIG. 1 showing their relative timing.

FIG. 4 shows the pulse patterns which may be applied when either N-channel or P-channel enhancement mode FET's are used. The solid line pulse pattern shows the timing and polarity of the pulsed voltage sources Φ1 through Φ4 for the N-channel enhancement mode field-effect transistor version while the dotted pulse pattern shows the timing and polarity for the P-channel enhancement mode field-effect transistor version. Referring now to FIGS. 3 and 4 and assuming that transistors T2′ and T5′ are N-channel enhancement mode FET's, the circuit of FIG. 3 operates as follows:

Assuming that input 56 applies a positive voltage on gate 55 of transistor T2′, when pulsed voltage source Φ1 applies a pulse 61 to circuit 51, diode D1 conducts in the forward direction and the gate capacitance of transistor T5′ is charged up approximately to the potential +V of pulsed voltage source Φ1 via node N3. During the interval when pulsed voltage source Φ1 applied pulse 61, voltage source Φ2 is at the same or greater voltage level as shown at 62 in FIG. 4. Thus, while transistor T2′ is conducting, diode D2 is nonconducting because either approximately the same potential +V appears at both terminals of that diode or a potential greater than +V at one terminal thereof prevents conduction in the forward direction. When pulse 61 terminates, pulsed voltage source Φ2 is activated and substantially ground potential shown at 63 in FIG. 4 is applied to diode D2. Because transistor T2′ is conducting as a result of the positive voltage on its gate 55, the gate capacitance of transistor T5′ now discharges via node N3, transistor T2′ and diode D2 to ground potential which is provided by pulsed voltage source Φ2.

If transistor T2′ were nonconducting as a result of ground potential on gate 55 of transistor T2′, the gate capacitance of transistor T5′ would remain charged to the value of pulsed voltage source Φ1 because T2′ is nonconducting and a high impedance is presented by diode D1. Thus, at the end of pulse 63, node N3 and the gate capacitance of transistor T5′ are either charged to approximately the potential +V or to ground, depending upon the conducting condition of transistor T2′. In any event, the information applied from input 56 now appears at the gate 57 of transistor T5′ in inverted form.

Referring now to circuit 52 of shift register stage 50, and assuming transistor T5′ to be nonconducting as a result of ground potential appearing on gate 57 thereof, when pulsed voltage source Φ3 is activated and a voltage represented by pulse 64 in FIG. 4 is applied to diode D3, output element 60 is charged up to approximately the voltage +V of pulsed voltage source Φ3. During the interval when pulsed voltage source Φ3 is applying pulse 64, pulsed voltage source Φ4 is applying the potential +V shown at 65 in FIG. 4 to diode D4. Transistor T5′, has been assumed to be in the nonconducting condition and, as a result, output element 60 remains charged to the potential of pulsed voltage source Φ3 because high impedances to the flow of current are presented by both diode D3 and FET T5′.

If, however, transistor T5′ is conducting as a result of a potential +V on its gate 57, output element 60 can discharge via node N4, transistor T5′ and diode D4 when pulsed voltage source Φ4 falls to ground potential as shown by pulse 66 in FIG. 4.

At the conclusion of the actuation of each of the four pulsed voltage sources Φ1 through Φ4, information which was initially applied from input 56 appears at output 60.

As noted hereinabove, if transistors T2′ and T5′ are P-channel devices, diodes D5 through D8 are utilized instead of diodes D1 through D4 and the dotted pulse pattern of FIG. 4 which is the mirror image of each of the pulses 61 through 66 is utilized. Shift register stage 50 operates in the same manner as described above except that conduction of diode D5, for example, occurs when the pulsed voltage source Φ1 goes from ground potential to a potential −V. When diode D5 conducts the gate capacitance of transistor T5′ is charged approximately to the potential −V during the interval when pulsed voltage source Φ1 is actuated.

At this point, it should be appreciated that while the pulse patterns of FIG. 4 have been referenced to zero or ground potential, the reference voltage need not be ground but could be any other appropriate voltage from which departures of the same polarity as shown in FIG. 4 are made for the appropriate N-channel or P-channel versions. From the foregoing, it may be seen that diodes have not merely been substituted for transistors T1, T3, T4, and T6 of FIG. 1. This is evidenced by the fact that if a direct substitution were made and the same polarity pulses applied, information would not be transferred from the input to the output of a shift register stage.

To implement the circuit of shift register stage 50, any standard handbook-type enhancement mode field-effect transistor may be utilized. Commercially available diodes may also be utilized. Fabrication of shift register stage 50 may be accomplished in the integrated circuit environment by taking advantage of well known photolithographic techniques and by simple diffusion steps well known to those skilled in the semiconductor manufacturing art. Briefly, by way of example, a P-type semiconductor substrate of silicon or germanium may be covered with a layer of silicon dioxide by evaporation, sputtering, or other well known techniques. After deposition of the silicon dioxide layer, a photoresist is applied, the photoresist is irradiated through a mask to provide openings in the photoresist through which an etchant for the silicon dioxide may be applied to remove selected portions of the silicon dioxide. Removal of the silicon dioxide forms apertures through which an N-type dopant such as phosphorous or arsenic may be introduced by well known diffusion techniques. The apertures in the silicon dioxide are again covered with silicon dioxide and using another photolithographic process, smaller apertures are provided into which a P-type dopant such as boron or gallium is introduced to selectively form P-type regions within previously diffused N-type regions. The N-type regions form the source and drain of an FET while the P-type regions diffused in the N-type regions form diodes which electrically are in series with the source/drain diffusions of the FET's being fabricated. After the P-type diffusions have been formed, the apertures are covered with silicon dioxide and using a third photolithographic step, a small opening is formed in one of the previously diffused P-type regions. An N-type dopant is diffused by well known techniques into this aperture to form a diode having the desired unidirectional current flow characteristics. The last aperture is covered with silicon dioxide and by still another photolithographic operation, apertures are selectively formed over the P-type diffusion areas and the N-type diffusion areas. After a thinning of the oxide in the region between the initial N-type diffusions where a gate region is desired, contact metallurgy is formed in these apertures and a gate electrode is formed. Simultaneously, with the formation of the contacts to the diode regions, an opening may be made in the silicon dioxide into which interconnecting metal is deposited to form a contact which bridges the initial N-type diffusion and the P-region into which the final N-type diffusion was made. In this manner, a diode is obtained which is in series with an N-type diffusion which forms a source/drain contact, of an FET. The metallization which bridges the PN junction carries current from the source/drain diffusion into a diode which is formed by a P-region and the final N-diffusion and from thence by an interconnection to a source of potential. Other diffusion arrangements are possible but the one described briefly hereinabove is one in which surface area required is reduced to a minimum.

The above-described circuit provides a shift register stage which has low power dissipation, has high performance and requires minimum surface area on a semiconductor chip.

While the invention has been particularly shown and described with reference to preferred embodiments thereof, it will be understood by those skilled in the art that the foregoing and other changes in form and details may be made therein without departing from the spirit and scope of the invention.

I claim:

1. A shift register stage comprising:

first and second circuits each comprising first and second diodes and a field-effect transistor connected in series, a node of said first circuit being connected to the gate of said transistor in said second circuit, a node of said second circuit being connected to an element responsive to the presence of electrical charge;

means connected to said first circuit for applying voltages to render said first diode conductive and said second diode nonconductive during a first interval to unconditionally charge the insulated gate of said field-effect transistor in said second circuit;

means connected to said first circuit for applying voltages to said second diode to render it one of conductive and nonconductive during a second interval to one of retain charge on and discharge said insulated gate;

means connected to said second circuit for applying voltages to render said first diode conductive and said second diode nonconductive during a third interval to charge said element responsive to the presence of electrical charge; and means connected to said second circuit for applying voltages to said second diode to render it one of conductive and nonconductive during a fourth interval to one of charge and discharge said element.

2. A shift register stage according to claim 1 wherein said means connected to said first circuit to render said first diode conductive and said second diode nonconductive during a first interval includes a first pulsed voltage source operative to apply a first potential which differs from a reference potential by a given polarity and magnitude to said gate only during said first interval and a second pulsed voltage source connected to said second diode operative to apply a potential of the same polarity and of at least equal magnitude as said first potential during said first interval.

3. A shift register according to claim 1 wherein said means connected to said first circuit for applying voltages to said second diode to render it one of conductive and nonconductive during a second interval includes a second pulsed voltage source connected to said diode operative to apply a potential equal to said reference potential thereto only during said second interval, said gate being one of charged and discharged via said second diode when said field-effect transistor is one of nonconductive and conductive, respectively, during said second interval and, an information source connected to the gate of said field-effect transistor in said first circuit to render it one of nonconductive, and conductive during at least a portion of said second interval.

4. A shift register stage according to claim 1 wherein said means connected to said second circuit for applying voltages to render said first diode conductive and said second diode nonconductive during a third interval includes a third pulsed voltage source connected to said first diode operative to apply a potential of the same polarity as first potential to said node only during said third interval and a fourth pulsed voltage source connected to said second diode operative to apply a potential of the same polarity and of at least equal magnitude as said third potential during said third interval.

5. A shift register stage according to claim 1 wherein said means connected to said second circuit for applying voltages to said second diode to render it one of conductive and nonconductive during a fourth interval includes a fourth pulsed voltage source connected to said diode operative to apply a potential, at least equal to said reference potential thereto only during said fourth interval, said element being one of charged and discharged during said fourth interval via said second diode responsive to one of the charged and discharged condition of the gate of said field-effect transistor.

6. A shift register stage according to claim 1 wherein said field-effect transistor is an enhancement mode field-effect transistor.

7. A shift register stage according to claim 1 wherein said element responsive to the presence of electrical charge is the gate capacitance of a field-effect transistor.

8. A shift register stage according to claim 1 wherein said first and second circuits are each connected to a similar shift register stage.

9. A shift register stage according to claim 3 wherein said reference potential is ground potential.

10. A shift register stage according to claim 5 wherein said reference potential is ground potential.

11. A shift register stage according to claim 6 wherein said enhancement mode field-effect transistor is an N-channel device.

12. A shift register stage according to claim 6 wherein said enhancement mode field-effect transistor is a P-channel device.

13. A shift register stage according to claim 1 wherein said first and second diodes are Schottky barrier diodes.